(12) United States Patent
Foster et al.

(10) Patent No.: US 6,654,835 B1
(45) Date of Patent: Nov. 25, 2003

(54) HIGH BANDWIDTH DATA TRANSFER EMPLOYING A MULTI-MODE, SHARED LINE BUFFER

(75) Inventors: Eric M. Foster, Owego, NY (US); Eric E. Retter, Warren Center, PA (US); Ronald S. Svec, Berkshire, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,068

(22) Filed: Mar. 23, 2000

(51) Int. Cl.[7] .................... G06F 13/00; G06F 13/28; G06F 13/38; G06F 15/16; G06F 15/167
(52) U.S. Cl. ...................... 710/110; 710/2; 710/14; 710/22; 710/52; 710/62; 710/72; 710/74; 710/100; 709/200; 709/208; 709/209; 709/211; 709/212; 709/213; 709/216; 709/232; 725/131; 725/132; 725/133; 725/134; 725/141; 725/142; 725/143; 725/151; 725/152; 725/153; 711/147
(58) Field of Search .................... 709/200, 208, 709/209, 211, 212, 213, 216, 232; 710/2, 14, 22, 20, 52, 62, 72, 74, 100, 101, 110, 129, 131, 132, 240, 300, 305, 316, 317; 711/147; 725/131–134, 141–144, 151–153

(56) References Cited

U.S. PATENT DOCUMENTS

| | | | | |
|---|---|---|---|---|
| 5,367,571 A | * | 11/1994 | Bowen et al. | 380/242 |
| 5,428,760 A | * | 6/1995 | Ghori et al. | 711/149 |
| 5,430,847 A | * | 7/1995 | Bradley et al. | 710/310 |
| 5,584,010 A | | 12/1996 | Kawai et al. | 395/444 |
| 5,619,250 A | * | 4/1997 | McClellan et al. | 725/132 |
| 5,664,117 A | | 9/1997 | Shah et al. | 395/280 |
| 5,748,945 A | * | 5/1998 | Ng | 703/23 |
| 5,960,215 A | | 9/1999 | Thomas et al. | 395/872 |
| 5,990,927 A | * | 11/1999 | Hendricks et al. | 725/132 |
| 6,003,100 A | * | 12/1999 | Lee | 710/301 |
| 6,081,533 A | * | 6/2000 | Laubach et al. | 370/421 |
| 6,189,064 B1 | * | 2/2001 | MacInnis et al. | 710/244 |
| 6,347,294 B1 | * | 2/2002 | Booker et al. | 703/28 |

OTHER PUBLICATIONS

IBM Technical Disclosure Bulletin, "Two–Way Flow Interface Circuit To Increase Computer Processing Throughput", vol. 32, No. 5A, (Oct. 1989), pp. 120–122.

* cited by examiner

Primary Examiner—Jeffrey Gaffin
Assistant Examiner—Tanh Q Nguyen
(74) Attorney, Agent, or Firm—William H. Steinberg, Esq.; Kevin P. Radigan, Esq.; Heslin Rothenberg Farley & Mesiti P.C.

(57) ABSTRACT

A technique for transferring data between a first device and a second device using a shared line buffer connected to a system bus which couples the first device and the second device. The technique includes (i) transferring data between the line buffer and dedicated memory associated with the first device, wherein the first device includes a data controller coupled to the system bus through a bus interface. The transferring (i) includes using the data transfer controller to effectuate a multiword data transfer between the dedicated memory and the line buffer. The technique further includes multiword data (ii) transferring between the line buffer and the second device across the system bus. When the transferring (i) precedes the transferring (ii), data is read from the dedicated memory from output to the second device, and when the transferring (ii) precedes the transferring (i), data is written to dedicated memory from the second device.

51 Claims, 6 Drawing Sheets

HIGH BANDWIDTH DATA TRANSFER EMPLOYING A MULTI-MODE, SHARED LINE BUFFER

TECHNICAL FIELD

Generally stated, presented herein is a technique for enhanced data transfer in a computing environment, and more particularly, to a multiword data transfer technique employing a multi-mode, shared line buffer coupled to a shared system bus connecting devices of the computing environment.

BACKGROUND ART

Full motion video and audio displays based on digital signals have become widely available. While these displays have many advantages, they also often require a massive amount of raw digital data. Because the storage and transmission of digital video and audio signals is central to many applications, and because an uncompressed representation of a video and audio signal requires a large amount of storage, the use of digital compression techniques is vital to this advancing art.

Several international standards for the compression of digital video and audio signals have emerged over the past decade, with more currently under development. These standards apply to algorithms for the transmission and storage of compressed digital data in a variety of applications, including: video-telephony and teleconferencing; high quality digital television transmission on coaxial and fiberoptic networks; as well as broadcast terrestrially and other direct broadcast satellites; and in interactive multimedia products on CD-ROM, digital audio tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 Standards. The MPEG algorithms have been developed by the Moving Picture Experts Group (MPEG), part of a joint technical committee of the International Standards Organization (ISO) and the International Electro-technical Commission (IEC). The MPEG Committee has been developing standards for the multiplex, compressed representation of video and associated audio signals.

Briefly summarized, the MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. Video and audio decoding in accordance with the MPEG-2 standard are described in greater detail in commonly assigned U.S. Pat. No. 5,576,765, entitled "Video Decoder", which is hereby incorporated herein in its entirety.

Audio/video decoders are typically embodied as general or special purpose processors and memory. Decoders that are used with television sets are often referred to in the industry as set-top box (STB) systems.

Stand-alone audio/video decoders currently used in STB systems generally utilize a dedicated interface to a specific transport chip and/or network interface module (NIM). However, as the required utility of these STB systems expands, it is becoming desirable to also interface various external devices to the base integrated system.

SUMMARY OF THE INVENTION

In order to support this capability, it is desirable that the integrated system of the set top box system be able to support relatively efficient and high speed communications with the external devices to provide the needed flexibility and function for the STB system. Two such devices which are increasingly required in a set top design are an external high-powered processor and an integrated drive electronics (IDE) storage device (i.e., a disk drive). An external processor can provide additional processing power for demanding software applications, while an IDE device allows increased system storage for features ranging from pc-like applications and games to pseudo-VCR type operations.

A limitation effecting these design scenarios involves data access. Existing data access methods are often slow for the amount of data that has to be moved. For example, typical applications require a processor to directly transfer each word or half word of data. Such a solution has the effect of lowering the effective processor performance, and/or the transfers are typically cumbersome to set up and control. Further, prior implementations typically employ dedicated interfaces for each external device coupled to the integrated system of the STB system.

Therefore, in order to establish commercial advantage, there is a need, for example, for an integrated device for an STB system capable of more efficiently interfacing with external devices for high bandwidth data transfer therebetween. The present invention is directed to meeting this need, as well as to others described herein.

The shortcomings of the prior art are overcome and additional advantages are provided through, e.g., the provision of a method for transferring data between a first device and a second device. The method includes: transferring data between the first device and the second device using a line buffer connected to a shared system bus, the shared system bus coupling the first device and the second device together, the transferring including: (i) transferring data between the line buffer and the dedicated memory of the first device, wherein the first device includes a data transfer controller coupled across a bus interface to the shared system bus, the transferring (i) including using the data transfer controller to transfer data between the dedicated memory and the line buffer across the shared system bus; and (ii) transferring data between the line buffer and the second device across the shared system bus, wherein the transferring (i) precedes the transferring (ii) when data is read from the dedicated memory for output to the second device, and the transferring (ii) precedes the transferring (i) when data is to be written to the dedicated memory from the second device.

In another aspect, present herein is a system for transferring data between a first device and a second device. The system includes means for transferring data between the first device and the second device using a line buffer connected to a shared system bus which couples the first device and second device together. The means for transferring includes: (i) means for transferring data between the line buffer and dedicated memory associated with the first device, wherein the first device includes a data transfer controller coupled across a bus interface to the shared system bus, and the means for transferring (i) includes means for using the data transfer controller to transfer data between the dedicated memory and the line buffer; and (ii) means for transferring data between the line buffer and the second device across a shared system bus. When the transferring (i) precedes the transferring (ii), data is read from the dedicated memory for output to the second device, and when the transferring (ii)

precedes the transferring (i) data is written to the dedicated memory from the second device.

In another aspect, a set top box system is provided which includes an integrated system having a direct memory access (DMA) controller, an internal processor, a line buffer, an arbiter, and a bus interface. The DMA controller is coupled to the internal processor and is coupled across the bus interface to a shared system bus. The line buffer and the arbiter are also each coupled to the system bus. The integrated system is connected to a dedicated memory and to a second device. The second device is connected to the integrated system across the shared system bus, while the dedicated memory is local to the integrated system. The second device comprises one of a DMA slave or a DMA master. The line buffer is adapted to function in a first data transfer mode as a DMA master, and a second data transfer mode as a DMA slave, depending upon whether the second device itself comprises a DMA slave or a DMA master, respectively. The line buffer comprises a shared line buffer and is employed in transferring data between the second device and the dedicated memory of the integrated system using two independent transfer operations. The arbiter arbitrates between the DMA controller, line buffer and second device for access to the shared system bus.

In a further aspect, the invention provides at least one program storage device readable by a machine, tangibly embodying at least one program of instructions executable by the machine to perform a method of transferring data between a first device and a second device, and in particular, between dedicated memory of the first device, and the second device. The method includes: transferring data between the first device and the second device using a line buffer connected to a shared system bus, the shared system bus coupling the first device and the second device together, the transferring including: (i) transferring data between the line buffer and dedicated memory of the first device, wherein the first device comprises a data transfer controller coupled across a bus interface to the shared system bus, the transferring (i) including using the data transfer controller to transfer data between the dedicated memory and the line buffer in a single, multiword transfer operation; and (ii) transferring data between the line buffer and the second device across the shared system bus in a second, single multiword data transfer operation. The transferring (i) precedes the transferring (ii) when data is read from the dedicated memory for output to the second device, while the transferring (ii) precedes the transferring (i) when data is to be written to the dedicated memory from the second device.

To restate, presented herein is a data transfer technique which implements, for example, a four word (16 byte) buffer integrated within a set top box system. Since this size matches the cache-line (or line) size of today's integrated microcontroller it is referred to herein as a "line buffer". Advantageously, the line buffer is configurable to appear, in one mode, as a direct memory access (DMA) device to both a dedicated memory subsystem of the integrated chip and to an external controller (such as an external processor) and, in a second mode, as a DMA device to the dedicated memory subsystem and as an IDE master to an external IDE drive. Setup of the line buffer is relatively simple, and includes setting appropriate direction and mode controls, and then activating the line buffer for operation. Since standard DMA and IDE interfaces can be employed, setup of the IDE device or DMA controller for line buffer operations is accomplished in a similar manner as for any other device. Additionally, once setup is complete, data transfer can proceed as a background operation to any processor activity, thus minimizing the impact on processor availability to run application code.

Advantageously, the present invention facilitates high speed transfers between two devices using, for example, a common DMA controller and bus master exchange protocol. Multi-word data transfers occur between the two devices through the use of two independent transfer operations running on a common transfer (e.g., DMA) controller contained within one of the devices, and a shared storage buffer (i.e., line buffer). In one embodiment, data is transferred to/from dedicated memory of the device having the DMA controller from/to the shared line buffer through the use, for example, of an internal DMA channel. Data is then transferred to/from the second device from/to the shared line buffer. If the second device is a DMA slave, the line buffer itself acts as a DMA master. If the second device is a DMA master, the data is transferred using an external DMA channel of that controller.

Additional features and advantages are realized through the techniques of the present invention. Other embodiments and aspects of the invention are described in detail herein and are considered a part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
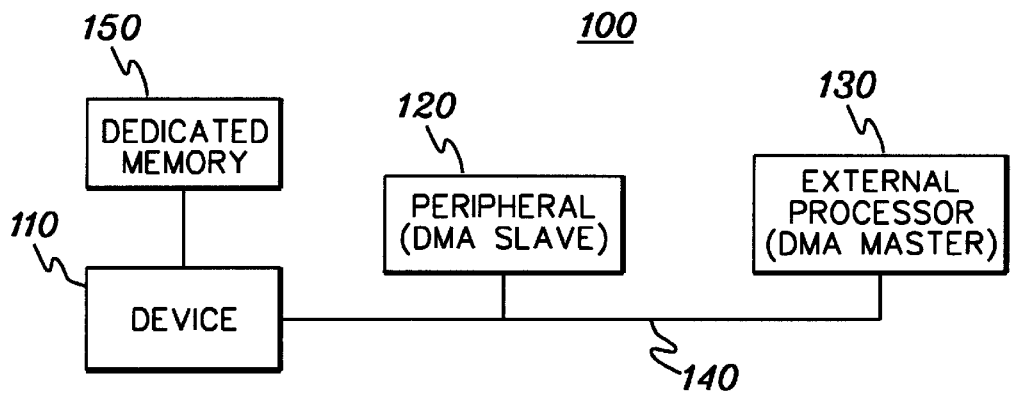
FIG. 1 depicts one example of a computing environment to employ a data transfer facility in accordance with the principles of the present invention.

FIG. 1 depicts one embodiment of a computing environment, generally denoted 100, to employ a data transfer facility in accordance with the principles of the present invention. Environment 100 includes an integrated device 110, for example, an integrated base controller for a set top box (STB) system, a peripheral 120 and an external processor 130. Peripheral 120 and processor 130 are coupled to device 110 across a shared system bus 140. In this example, peripheral 120 is assumed to comprise a DMA slave, while the external processor comprises a DMA master. Device 110 also has local, or dedicated memory 150 associated therewith. The data transfer facility presented herein allows efficient transfer of data to/from either a DMA master or DMA slave to, for example, the dedicated memory pool coupled to the integrated device. Additionally, the data transfer facility inherently buffers data should, for example, a DMA slave request go inactive prior to completing a multiword transfer of data to the DMA slave.

Figure 2:
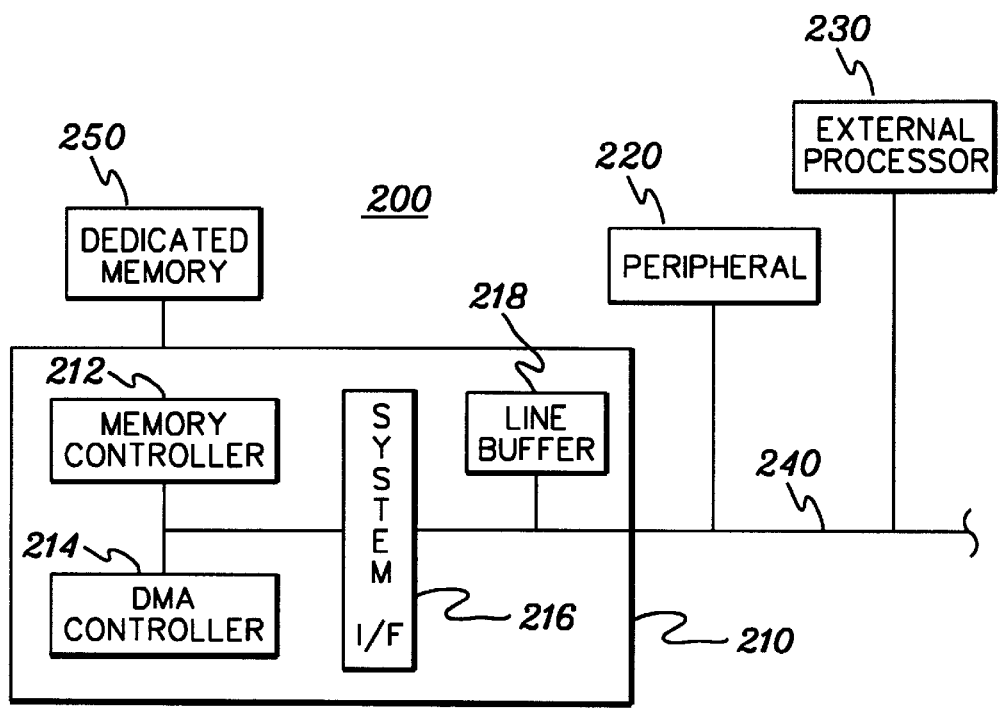
FIG. 2 depicts one embodiment of the computing environment of FIG. 1 implementing the data transfer facility of the present invention.

FIG. 2 depicts in greater detail a computing environment 200 to employ a data transfer facility in accordance with this invention. Environment 200 again includes a device 210, such as an integrated base controller of a STB system, that is coupled across a shared system bus 240 to a peripheral 220 and an external processor 230. Device 210 has dedicated memory 250 coupled thereto, for example, through a memory controller 212. A direct memory access (DMA) controller 214 functions as a data transfer controller as described below. Controller 214 is coupled to shared system bus 240 across a system interface 216, also referred to herein as a bus interface or external bus interface unit.

In the embodiment of FIG. 2, a line buffer 218 is shown disposed within device 210 and coupled to the shared system bus 240. As used herein, line buffer 218 is referred to as a shared line buffer since the buffer is shared by controller 214 and peripheral 220 and/or external processor 230 when transferring data. In addition, as explained below, line buffer 218 is configurable in a first data transfer mode to function, for example, as an IDE master (bus master) to an external peripheral such as an IDE drive, and in a second data transfer mode as a DMA device (bus slave) to both the dedicated memory subsystem of the integrated device and the external device, such as an external processor. When active, data transfers, for example, between dedicated memory 250 and peripheral 220 or external processor 230 employ line buffer 218 in a two-step transfer operation as described further below with reference to FIGS. 3–6.

Figure 3:
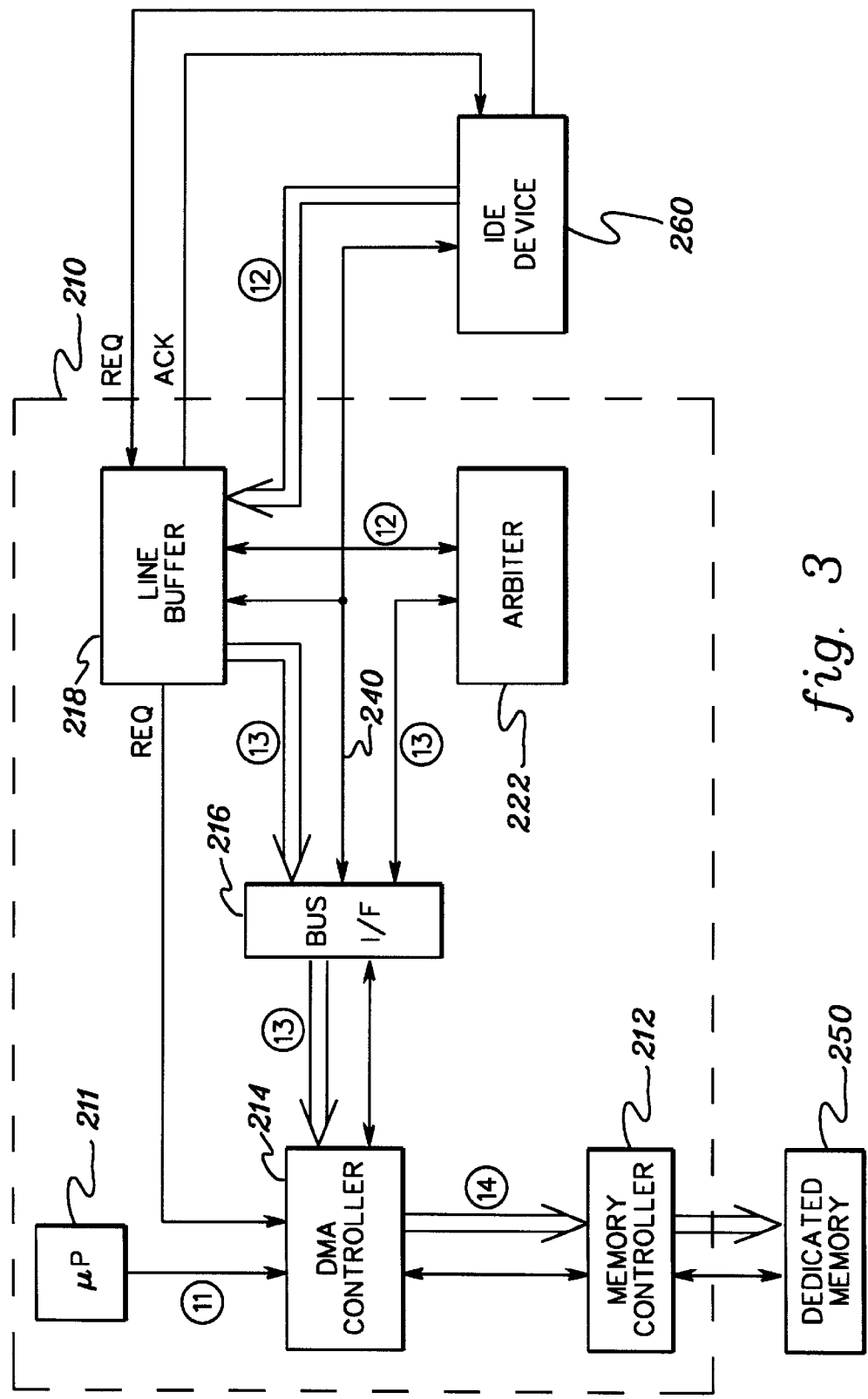
FIG. 3 depicts in greater detail one example of the computing environment of FIG. 2 implementing the data transfer facility of the present invention to read data from an external IDE device for writing to dedicated memory of the integrated device.

FIG. 3 depicts one embodiment of a multiword read IDE device operation, wherein data is read from device 260 for writing to dedicated memory 250 of device 210. In this embodiment, device 210 includes an internal microprocessor 211, a DMA controller 214 coupled thereto and to a memory controller 212 for accessing local memory 250. Controller 214 is connected to shared system bus 240 across a bus interface 216. Pursuant to the invention, a shared line buffer 218 is also connected to shared system bus 240 and an arbiter 222 is provided for arbitrating between controller 214, buffer 218 and device 260 for access to bus 240. Arbiter 222 can work in conjunction with an existing external bus arbiter (not shown) for the shared system bus 240, and is provided to facilitate the additional data transfer steps described herein. IDE device 260 is provided as one example of a bus slave from which data is to be read employing a first data transfer mode of line buffer 218.

Operationally, internal microprocessor 211 sets up DMA controller 214, line buffer 218 and IDE device 260 to accomplish reading of data from the IDE device. After setup, device 260 and line buffer 218 interact using standard request and acknowledge handshaking signals to initiate transfer of data (12) from device 260 to line buffer 218. Data is transferred once buffer 218 obtains possession (12) of the shared system bus 240 via arbiter 222. As one example, a multiword data transfer from device 260 to buffer 218 may comprise 16 bytes of data. Once line buffer 218 is full, it releases control of external system bus 240 and initiates a request to DMA controller 214 for the controller to read data from the buffer. The DMA controller 214 then takes control (13) of the shared system bus 240 through arbiter 222, and reads data out of the buffer into the controller 214 through bus interface 216. Once in possession of the multiple bytes of data, controller 214 writes the data (14) to dedicated memory 250.

Note that as described herein shared system bus 240 comprises a shared external bus which may be shared between many devices, only two of which are shown in FIGS. 3–6. Also, note that arbiter 222 manages control of external bus 240 when necessary to allow for the two step data transfer described herein.

In one embodiment, the arbitration mechanism 222 can be fairly simple, taking requests for ownership (BusReq) of the shared system bus 240, and applying a priority scheme, deciding which master should receive bus ownership. The priority scheme used is selectable via programming between a fixed (master X has highest priority) and alternating priority. The handshaking protocol used for controlling bus ownership may utilize three signals:

BusReq: Bus Request from a bus master to the arbiter, indicating that this master would like control of the shared system bus.

HoldReq: Request from the arbiter to a bus master asking that bus master relinquish ownership of the shared system bus.

HoldAck: Indication from a bus master to the arbiter that this bus master does not have control of the shared system bus.

Operationally, a bus master needing control of the bus would activate it's BusReq. The arbiter would then decide if that master can take control of the bus from the current master, if any, and then activate HoldReq to all bus masters. Once the current bus master relinquishes control of the shared system bus, it activates it's HoldAck to indicate this to the arbiter. The arbiter then deactivates HoldReq to the requesting bus master to grant it ownership, with this bus master then deactivating its HoldAck indicating that it has taken ownership of the shared system bus.

There are various other priority schemes and handshaking protocols known in the industry which may also be applied in place of those described. For example, reference co-pending, commonly assigned U.S. patent application, Ser. No. 09/158,267, entitled "Upgradeable Highly Integrated Embedded CPU System," the entirety of which is hereby incorporated herein by reference.

In this example, line buffer 218 operates in a first data transfer mode as an IDE master for the IDE slave device 260. In general, the line buffer as proposed herein may comprise a small memory array (e.g., 16 bytes) along with various control circuits to drive the read and write transfers described, and provide the necessary handshaking protocols to the IDE and internal/external DMA interfaces. Based on the control information provided by the internal or external processor during the line buffer setup, the control circuits are configured to provide and respond to the appropriate interface protocols. Once activated, the control circuitry simply attempts to perform a transfer by alternately filling and emptying the line buffer array. Requests/Acknowledge signals are steered to the appropriate internal or external DMA controller, or IDE device, depending on the transfer direction and empty/fill state of the buffer.

FIG. 4 again depicts the computing environment of FIG. 3 and in this example the data transfer operation is assumed to comprise a read from dedicated memory and write to the external IDE device. Again, the multiword data transfer operation comprises transferring multiple bytes, e.g., greater than two bytes, of data at one time between, for example, local memory 250 of integrated device 210 and external disk drive 260. Arbiter 222 again arbitrates between, for example, line buffer 218, bus interface 216, and IDE device 260.

Operationally, processing begins with setting up of the data transfer by internal microprocessor 211. For example, the processor sets up (21) DMA controller 214, line buffer 218 and IDE device 216 to coordinate the sending and receiving of the multiword data transfer. After setup, line buffer 218 sends a request to DMA controller 214 indicating it is ready to receive a multiword data transfer. Controller 214 begins reading data (22) out of dedicated memory 250 and after obtaining control (23) of the shared system bus 240, via arbiter 222, transfers the data (23) through bus interface 216 to line buffer 218. Once full, the line buffer 218 obtains control (24) of the shared system bus 240 via arbiter 222. (Arbiter 222 employs a conventional request and grant arbitration protocol.) Once control of the bus is obtained, and the IDE device 260 has requested data from line buffer 218, the data is transferred (24) into IDE device 260.

Note that by employing a multistep data transfer process, wherein multiple words of data are simultaneously transferred, the data is automatically buffered within line buffer 218 should the DMA slave (e.g., IDE device) go inactive prior to writing of the entire multiword data burst transfer.

Figure 4:
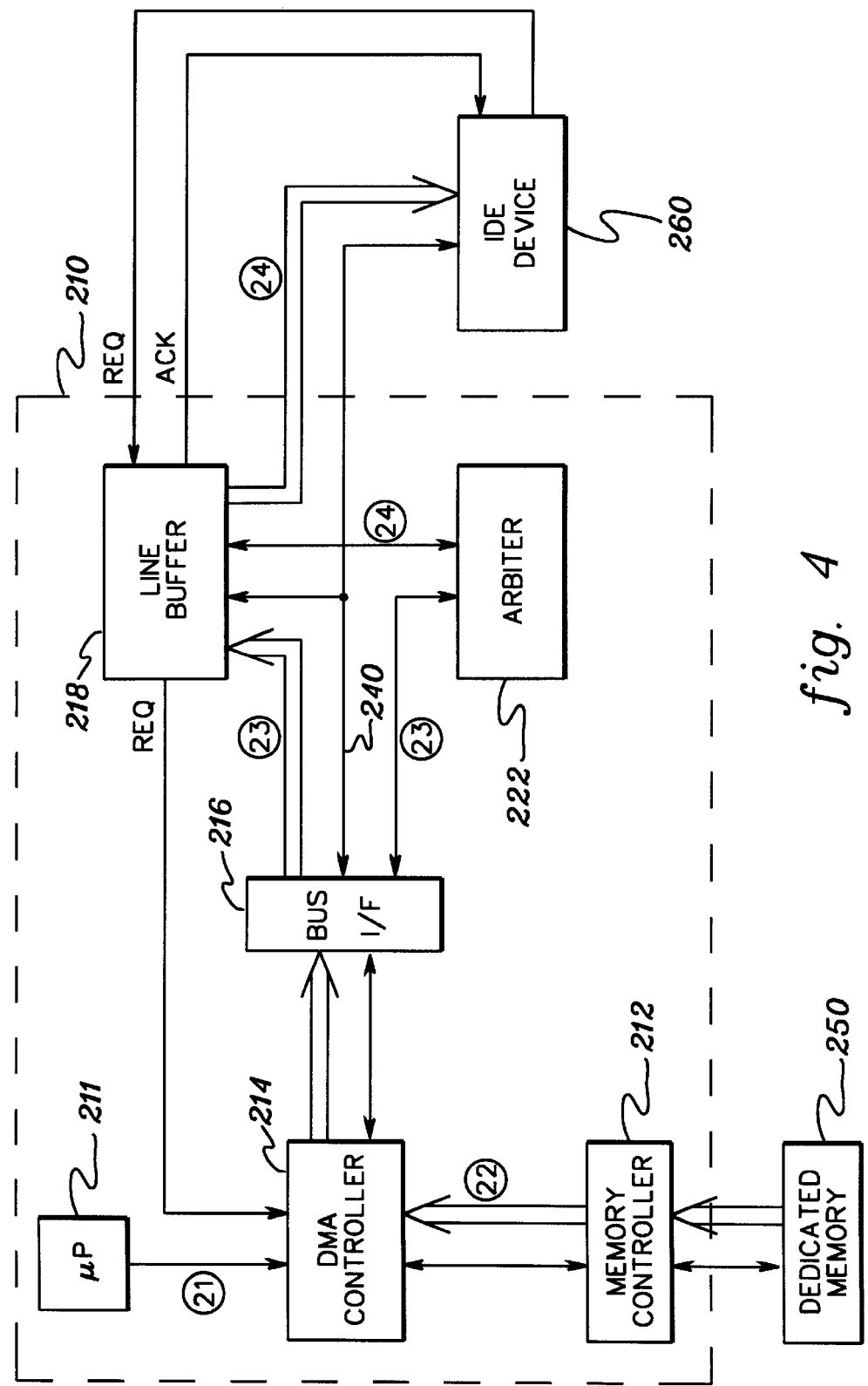
FIG. 4 depicts in greater detail one example of the computing environment of FIG. 2 implementing the data transfer facility of the present invention for reading data from dedicated memory for writing to the external IDE device.

By way of further explanation, the transfers depicted in FIGS. 3 & 4 are discussed in greater detail below. In implementation, the shared line buffer works in close concert with the on-chip DMA controller and bus interface, along with bus arbitration logic. In a first data transfer mode, the shared line buffer is employed to transfer data between, for example, dedicated memory of the integrated device and an external IDE device. This data transfer mode requires that the DMA controller and bus interface be properly set up. For example, a "memory to memory line mode" operation should be set up for the internal DMA controller to correctly communicate with the shared line buffer. Additionally, the bus interface should be configured to access the line buffer as an SRAM in burst mode. The block sizes supported by this mode should be a multiple of 16 bytes, and can be as large as the controller and IDE device allow. IDE mode selection in the line buffer may support two standard IDE configurations, namely a first configuration with a 150 ns base cycle time, and a second configuration with a 120 ns base cycle time.

The following sequence of actions would be performed for a transfer in these modes:

The internal microprocessor sets up the shared line buffer by indicating the mode (DMA v. IDE) and direction (read/write) of the transfer, and then initiates the operation by setting a line buffer active bit in the arbiter register.

The internal microprocessor of the integrated device sets up the DMA controller to use the shared line buffer and transfer the appropriate size data block.

The internal microprocessor sets up the IDE device to transfer the appropriate size data block.

The line buffer then drives the transfer by alternately transferring, for example, 16 byte blocks of data between the IDE device and the line buffer, and the line buffer and the DMA channel.

Completion of the operation is signaled by either or both of the DMA controllers completing their respective transfers.

More particularly, the following is an example of an IDE write operation, which assumes that the line buffer is initially empty:

Line buffer receives DMA_REQ from IDE device

Line buffer issues DMA_REQ to DMA controller if empty.

DMA controller reads 16 bytes from SDRAM (dedicated memory) and sends write request to external bus interface.

External bus interface requests bus using BusReq and writes to line buffer (as SRAM device).

When full, line buffer drops DMA_REQ and requests bus from arbiter by asserting BusReq.

Arbiter deactivates HoldReq when bus control is granted.

Line buffer sends data to IDE device using DMA_ACK output.

If IDE device goes inactive, line buffer drops BusReq and arbiter activates HoldReq to relinquish bus to external bus interface.

As noted above, once initialized, the data transfer precedes with the line buffer pacing the operation by alternately filling and emptying over the internal DMA (i.e., DMA controller and bus interface) and external IDE (i.e., external shared system bus to the IDE drive device) pathways. Initially, the line buffer must be filled, therefore it will initiate an operation to the appropriate device, either a read from the internal DMA controller, or a read from the external IDE drive, depending upon whether the data transfer is an IDE line write or an IDE line read, respectively. Once the line buffer is filled, it will initiate the complementary operation, i.e., either a write to the IDE drive, or a write to the internal DMA controller, for their respective "IDE line write" or "IDE line read" data transfers. This process repeats as necessary until the entire data block is transferred. Normal prioritization for external bus ownership and control protocols are followed (BusReq/HoldReq/HoldAck sequencing through the arbiter), allowing these transfers to mesh well with other system activity occurring on the same external bus.

Figure 5:
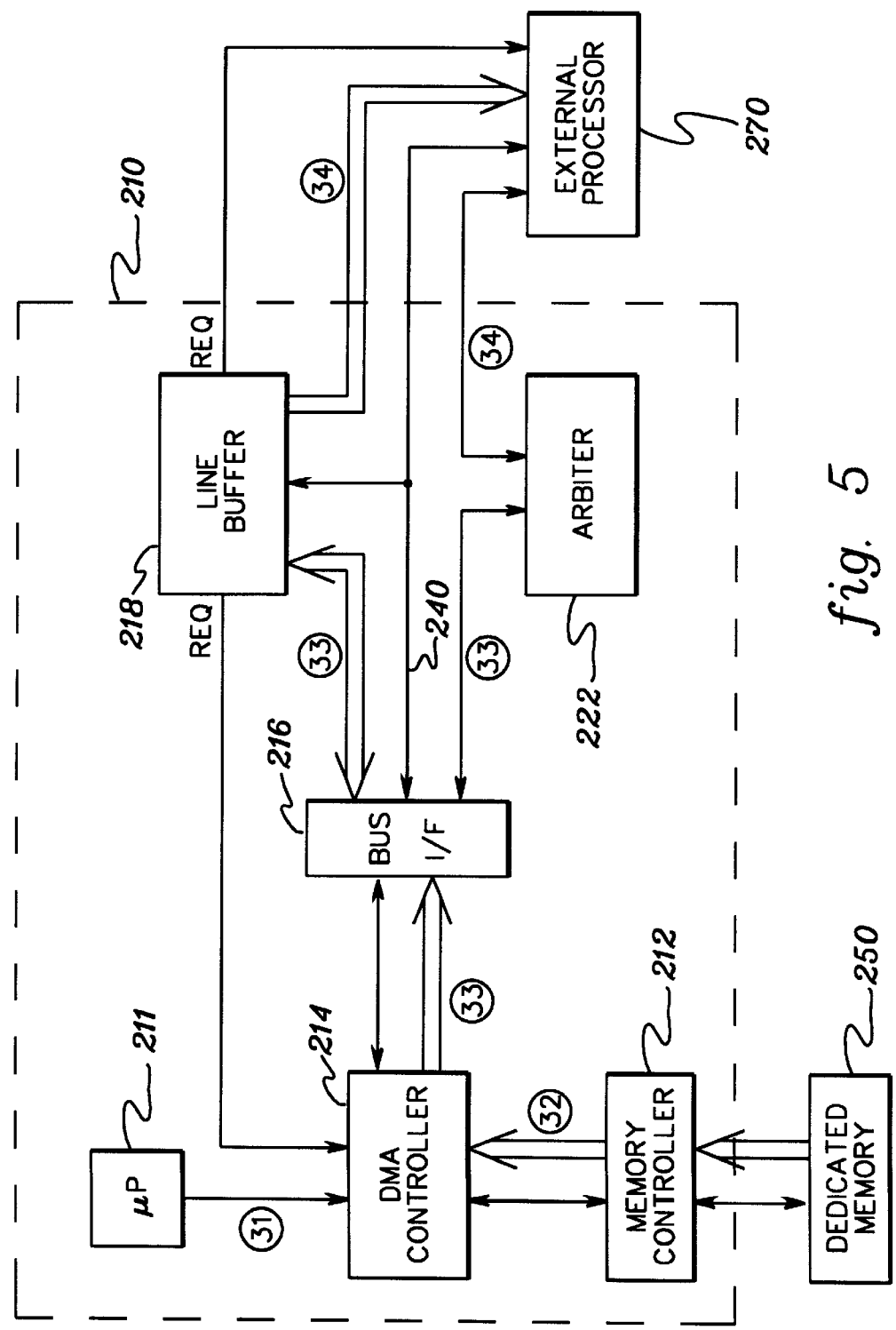
FIG. 5 depicts in greater detail one example of the computing environment of FIG. 2 implementing a data transfer facility in accordance with the principles of the present invention for multiword data transfers from a dedicated memory, associated with the integrated device, to an external processor.
Figure 6:
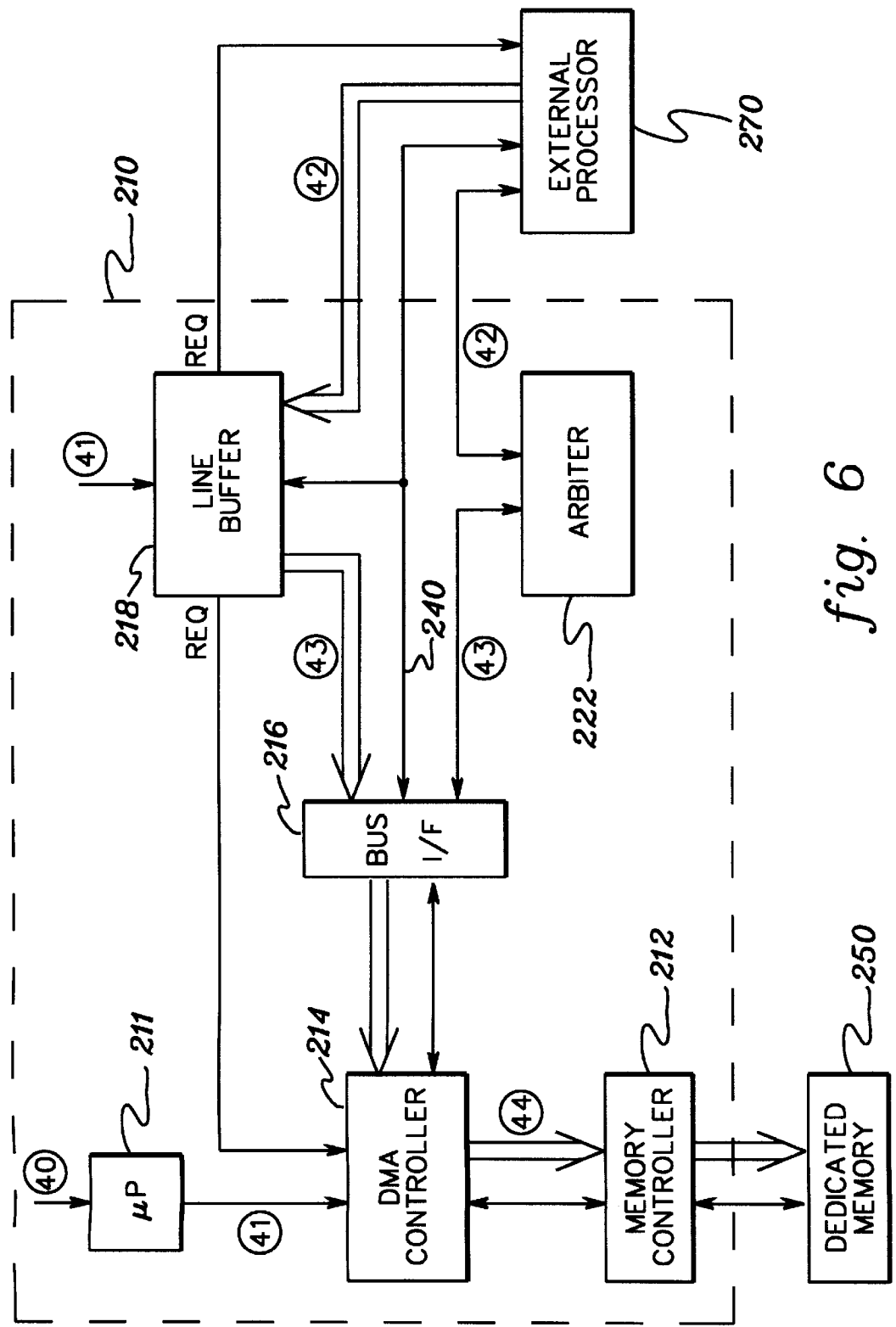
FIG. 6 depicts in greater detail one example of the computing environment of FIG. 2 implementing a data transfer facility in accordance with the principles of the present invention for multiword data transfers from an external processor to dedicated memory associated with the integrated system.

FIGS. 5 & 6 depict an alternate example of a computing environment employing a data transfer facility in accordance with the present invention. This environment is similar to that depicted in FIGS. 3 & 4 except that the IDE device of FIGS. 3 & 4 is replaced by an external processor 270. Processor 270 is a bus master, and therefore, line buffer 218 functions in a different data transfer mode than the mode employed for reading and writing data from a bus slave, such as the IDE device of FIGS. 3 & 4. In this example, arbiter 222 arbitrates between bus interface 216 and external processor 270 for access to the shared system bus.

In operation, external processor 270 initially sets up internal processor 211 and line buffer 218 to either read data from dedicated memory 250 for transfer to external processor 270 (FIG. 5) or write data to dedicated memory 250 from external processor 270 (FIG. 6). Referring first to FIG. 5, responsive to external processor 270, internal processor 211 sets up (31) DMA controller 214 for reading the desired data from dedicated memory 250. The data is read out (32) of the dedicated memory into the DMA controller, and line buffer 218 signals controller 214 when it can accept data (REQ). DMA controller obtains control (33) of the shared system bus 240 via arbiter 222. After obtaining control of bus 240, data transfer controller 214 transfers (33) the data into line buffer 218 via bus interface 216. In this example, line buffer 218 functions as a external DMA slave to external processor 270, which is now the DMA master. Line buffer 218 sends a request to external processor 270 informing it that it has data for the processor to read, and external processor 270 takes control (34) of shared system bus 240, via arbiter 222, and reads (34) the data out of the line buffer.

FIG. 6 depicts the same computing environment as FIG. 5, only in this example data is flowing from external processor 270 to dedicated memory 250 through device 210 employing the structures described above. First, external processor 270 initiates setup (40) through internal processor 211. This setup (41) includes setting the DMA controller for the transfer of data, as well as line buffer 218. In this example, line buffer 218 again functions as a DMA slave. Processing begins with a request signal from line buffer 218 for data from external processor 270. Processor 270 obtains control (42) of the shared system bus 240, via arbiter 222, and writes (42) data into the line buffer. Once the line buffer is full, line buffer 218 raises the request to DMA controller 214 to read data from the buffer. DMA controller 214 obtains control (43) of the system bus 240, again, via arbiter 222, and data is read (43) from line buffer 218 through bus interface 216 into the DMA controller 214. Thereafter, the DMA controller 214 writes (44) the transmitted data into dedicated memory 250 employing memory controller 212.

By way of further example, using the configuration of FIGS. 5 & 6, an external bus master may access any valid dedicated memory address of the integrated device. This again requires that the DMA controller and system interface be properly set up. A "memory to memory line mode" operation should be set up for the internal DMA controller to correctly communicate with the shared line buffer. Additionally, the bus interface should be configured to access the shared line buffer as an SRAM in burst mode. The block sizes supported for this mode must be a multiple of 16 bytes and can be as large as the DMA controllers allow. By way of example, the following sequence of actions may be performed for a transfer in this mode:

- The DMA controller is set up to use the shared line buffer and transfer the appropriate size data block. This set up may be done by application code running on either the internal microprocessor or the external processor.
- The external processor sets up its own DMA controller to access the integrated device and transfer the appropriate size data block. The line buffer address should be used as the target address for the DMA transfer.
- The line buffer is set up by indicating the mode (DMA v. IDE) and direction (read/write) of the transfer. The operation is then initiated by setting the line buffer active bit in the arbiter register. Again, this set up may be done by either the internal processor or the external processor.
- The line buffer will then drive the transfer by alternately transferring, for example, 16 byte blocks between the external processor and line buffer, and the line buffer and the DMA controller of the integrated device.
- Completion of the operation is signaled by either or both of the DMA controllers completing their respective transfers.

Similar to the above, after initialization, the data transfer proceeds with the line buffer pacing the operation by alternately filling and emptying over the internal DMA and external DMA pathways. Initially, the line buffer must be filled, therefore it will initiate an operation to the appropriate device, i.e., either a read from the internal DMA controller, or a read from the external DMA controller, depending on whether the data transfer is a "DMA line read" or a "DMA line write" respectively. Note that the relative direction of "read" and "write" are opposite those for the IDE transfers as the data source is now considered to be the external processor. Once the line buffer is filled, it will initiate the complementary operation, either a write to the external DMA controller, or a write to the internal DMA controller, for their respective "DMA line read" or "DMA line write" data transfers. This process repeats as necessary until the entire data block is transferred. As before, normal prioritization for external bus ownership and control protocols are followed (BusReq/HoldReq/HoldAck sequencing through the arbiter) allowing these transfers to mesh well with other system activity occurring on the same external bus.

Figure 7:
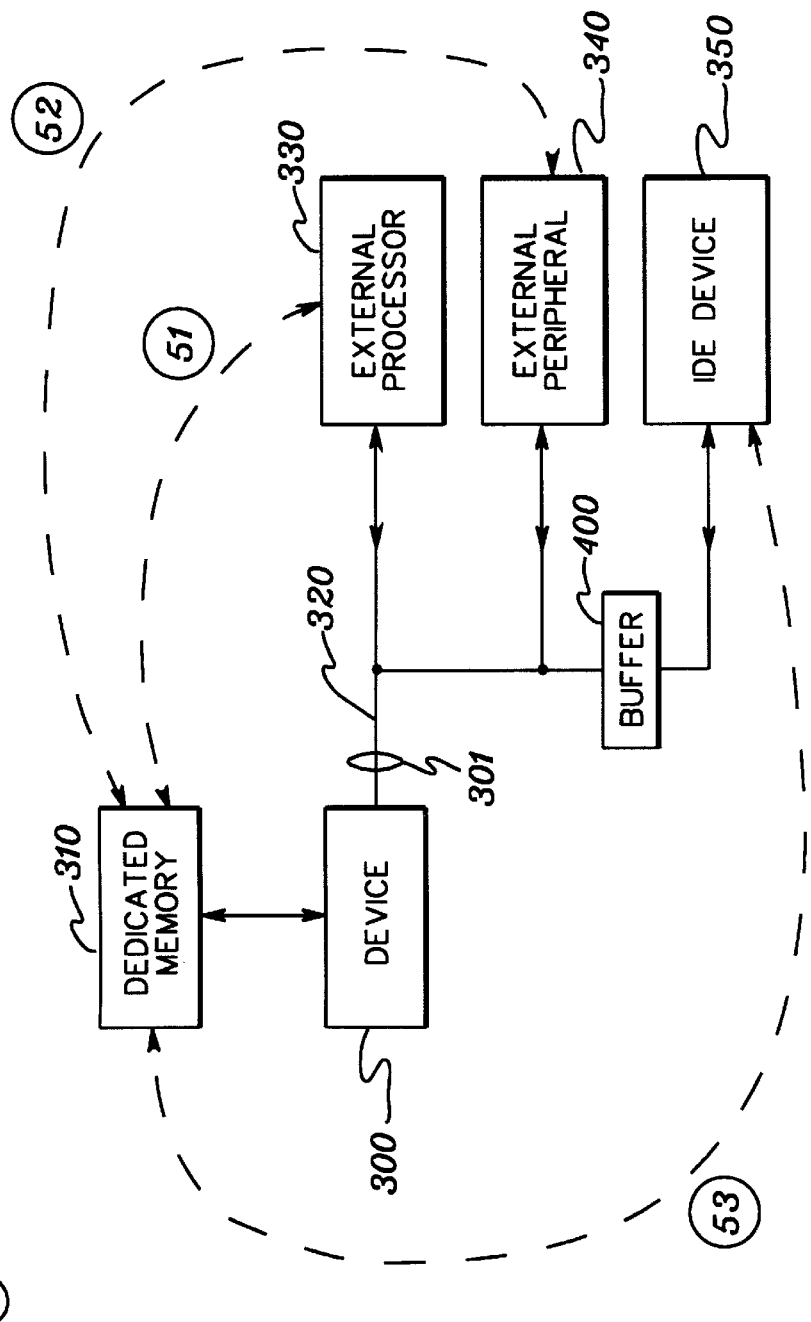
FIG. 7 is a block diagram of a computing environment showing various transfers which can occur across a common set of bus pins when employing a data transfer facility in accordance with the principles of the present invention.

Those skilled in the art will note from the above discussion that an advantage of the present invention is that a single set of system bus pins is employed to transfer data between dedicated memory of the integrated device and one or more peripheral units coupled thereto across a shared system bus. FIG. 7 depicts this concept wherein device 300 has local memory 310 and is coupled to a shared system bus 320. Also connected to shared system bus 320 are an external processor 330, an external peripheral 340 and an IDE device 350. In this example, a bus driver buffer 400 is shown disposed between shared system bus 320 and IDE device 350. In one example, device 300 may interface to system bus 320 through a set of 50 shared bus pins 301. As described above, data can be transferred between dedicated memory 310 and external processor 330 (51), or between dedicated memory 310 and an external peripheral (i.e., any DMA slave) 340 (52) or between dedicated memory 310 and an IDE device 350 (53).

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for transferring data between a first device and a second device, said method comprising:

transferring data between the first device and the second devices using a line buffer connected to a shared system bus, the shared system bus coupling the first device and the second device, said transferring comprising:

(i) transferring data between the line buffer and dedicated memory of the first device, wherein the first device comprises a data transfer controller coupled to the shared system bus through a bus interface, said transferring (i) comprising using the data transfer controller to transfer data between the dedicated memory and the line buffer;

(ii) transferring data between the line buffer and the second device across the shared system bus, wherein said transferring (i) precedes said transferring (ii) when data is read from said dedicated memory for output to the second device, and wherein said transferring (ii) precedes said transferring (i) when data is to be written to said dedicated memory from said second device;

wherein said method further comprises setting up the line buffer as a bus slave or a bus master depending upon whether the second device comprises a bus master or a bus slave, respectively; and wherein said transferring data comprises transferring a block of data comprising multiple words of data utilizing a single transferring (i) operation and a single transferring (ii) operation.

2. The method of claim 1, wherein the line buffer comprises a first transfer mode and a second transfer mode, wherein when in the first transfer mode, the line buffer functions as a bus master, and when in the second transfer mode the line buffer functions as a bus slave.

3. The method of claim 2, wherein the line buffer is in the first transfer mode when the second device comprises a bus slave device, and is in the second transfer mode when the second device comprises a bus master device.

4. The method of claim 3, wherein the line buffer is in the first transfer mode when said second device comprises a disk drive, and the line buffer is in the second transfer mode when the second device comprises a processor.

5. The method of claim 2, wherein during said transferring (ii) the line buffer takes control of the shared system bus.

6. The method of claim 2, wherein the line buffer resides within said first device, and said method further comprises providing an arbiter within said first device to manage access to the shared system bus between said data transfer controller, the line buffer and the second device.

7. The method of claim 2, wherein the second device comprises a bus slave, and wherein the line buffer is in the first transfer mode to coordinate reading of data from the bus slave for writing to the dedicated memory or coordinate writing of data to the bus slave from the dedicated memory.

8. The method of claim 7, wherein the reading of data from the bus slave for writing to dedicated memory comprises initiating a request for data from the line buffer to the bus slave, said transferring (ii) of the data from the bus slave to the line buffer, and thereafter, requesting the controller to read data from the line buffer, and said transferring (i) of data from the line buffer to the controller for writing to the dedicated memory.

9. The method of claim 7, wherein said writing of data to the bus slave from dedicated memory comprises sending a request for data from the line buffer to the data transfer controller of the first device, reading by the controller data from dedicated memory, said transferring (i) of data from the controller to the line buffer, and thereafter, said transferring (ii) of data from the line buffer to the bus slave.

10. The method of claim 7, further comprising setting up the line buffer, the data transfer controller, and the bus slave for one of said reading of data from the bus slave for writing to the dedicated memory or said writing of data to the bus slave from the dedicated memory, wherein said setting up can be accomplished by an internal processor of said first device.

11. The method of claim 2, wherein the second device comprises an external bus master, and the line buffer functions within the second transfer mode as a bus slave, and wherein said transferring comprises transferring (i) data from the dedicated memory to the data transfer controller, sending a request from the line buffer to the data transfer controller for the read data, transferring (i) the data from the data transfer controller to the line buffer across the shared system bus, signaling the external bus master that the shared line buffer has data, assuming control of the shared system bus by the external bus master and transferring (ii) the data from the line buffer to the external bus master.

12. The method of claim 2, wherein the second device comprises an external bus master, and the line buffer comprises a bus slave, and wherein the transferring comprises writing data from the external bus master to the first device for transfer to the dedicated memory, said writing of data comprising signaling from the line buffer to the external bus master that the line buffer can accept data, obtaining control of the shared system bus by the external bus master and transferring (ii) the data to the line buffer, thereafter, signaling the data transfer controller that the line buffer has data, obtaining control of the system bus by the data transfer controller and transferring (i) the data from the line buffer to the data transfer controller for writing to the dedicated memory.

13. The method of claim 1, wherein the line buffer resides within the first device, and wherein said transferring (i) comprises employing an internal DMA channel to transfer data between the line buffer and the dedicated memory, and wherein said transferring (ii) comprises employing an external DMA channel to transfer data between the line buffer and the second device.

14. The method of claim 1, wherein the first device is coupled to the shared system bus across a single set of bus pins and wherein multiple types of read/write functions can occur across the single set of bus pins depending upon the second device, wherein the second device comprises at least two different functional units coupled to the shared system bus.

15. The method of claim 14, wherein said multiple types of functions include allowing transfers between any one of the dedicated memory of the first device and one of an external processor, an external peripheral and an external disk drive device, wherein the external processor, the external peripheral and the disk drive device comprise the at least two different functional units.

16. The method of claim 1, wherein the first device comprises an integrated system of a set top box system, the integrated system including a memory controller coupled to the dedicated memory, an internal processor coupled to the data transfer controller, an arbiter for arbitrating access to the shared system bus, and a bus interface coupled between the data transfer controller and the shared system bus, wherein the data transfer controller is a DMA controller.

17. The method of claim 16 wherein the second device is one of a DMA slave or a DMA master coupled to the shared system bus.

18. The method of claim 17, wherein the second device comprises the DMA slave, the DMA slave comprising a disk drive device.

19. The method of claim 17, wherein the second device comprises the DMA master, the DMA master comprising an external processor coupled to the shared system bus.

20. The method of claim 1, wherein said transferring (i) comprises a first transfer operation and said transferring (ii) comprises a second transfer operation, wherein said first and second transfer operations are independent, said first and second transfer operations sharing said line buffer.

21. A system for transferring data between a first device and a second device, said system comprising:

means for transferring data between the first device and the second device using a line buffer connected to a shared system bus, the shared system bus coupling the first device and the second device, said means for transferring comprising:

(i) means for transferring data between the line buffer and dedicated memory of the first device, wherein the first device comprises a data transfer controller coupled across a bus interface to the shared system bus, and said means for transferring (i) comprises means for using the data transfer controller to transfer data between the dedicated memory and the line buffer;

(ii) means for transferring data between the line buffer and the second device across the shared system bus, wherein said means for transferring (i) precedes said means for transferring (ii) when data is read from said dedicated memory for output to the second device, and wherein said transferring (ii) precedes said transferring (i) when data is to be written to said dedicated memory from said second device;

wherein said system further comprises means for setting up the line buffer as a bus slave or a bus master depending upon whether the second device comprises a bus master or a bus slave, respectively; and wherein said means for transferring data comprises means for transferring a block of data comprising multiple words of data using a single transferring (i) operation and a single transferring (ii) operation.

22. The system of claim 21, wherein the line buffer comprises a first transfer mode and a second transfer mode, wherein when in the first transfer mode, the line buffer functions as a bus master, and when in the second transfer mode the line buffer functions as a bus slave.

23. The system of claim 22, wherein the line buffer is in the first transfer mode when the second device comprises a bus slave device, and is in the second transfer mode when the second device comprises a bus master device.

24. The system of claim 23, wherein the line buffer is in the first transfer mode when said second device comprises a disk drive, and the line buffer is in the second transfer mode when the second device comprises a processor.

25. The system of claim 22, wherein said means for transferring (ii) comprises means for the line buffer taking control of the shared system bus.

26. The system of claim 22, wherein the line buffer resides within the first device, and said system further comprises an arbiter within the first device which manages access to the shared system bus between the data transfer controller, the line buffer and the second device.

27. The system of claim 22, wherein the second device comprises a bus slave, and wherein the line buffer is in the first transfer mode and comprises means for reading data from the bus slave for writing to the dedicated memory, and for writing data to the bus slave from the dedicated memory.

28. The system of claim 27, wherein the means for reading data from the bus slave for writing to dedicated memory comprises means for initiating a request for data from the line buffer to the bus slave, said means for transferring (ii) of the data from the bus slave to the line buffer, and thereafter, means for requesting the controller to read data from the line buffer, and said means for transferring (i) of data from the line buffer to the controller for writing to the dedicated memory.

29. The system of claim 27, wherein said means for writing data to the bus slave from dedicated memory comprises means for sending a request for data from the line buffer to the data transfer controller of the first device, means for reading, by the controller, data from dedicated memory, said means for transferring (i) data from the controller to the line buffer, and thereafter, said means for transferring (ii) data from the line buffer to the bus slave.

30. The system of claim 27, further comprising means for setting up the line buffer, the data transfer controller, and the bus slave for one of said reading of data from the bus slave for writing to the dedicated memory or said writing of data to the bus slave from the dedicated memory, wherein said setting up can be accomplished by an internal processor of said first device.

31. The system of claim 27, wherein the second device comprises an external bus master, and the line buffer functions within the second transfer mode as a bus slave, and wherein said means for transferring comprises means for transferring (i) data from the dedicated memory to the data transfer controller, means for sending a request from the line buffer to the data transfer controller for the read data, means for transferring (i) the data from the data transfer controller to the line buffer across the shared system bus, means for signaling the external bus master that the shared line buffer has data, means for assuming control of the shared system bus by the external bus master and means for transferring (ii) the data from the line buffer to the external bus master.

32. The system of claim 27, wherein the second device comprises an external bus master, and the line buffer comprises a bus slave, and wherein the means for transferring comprises means for writing data from the external bus master to the first device for transfer to the dedicated memory, said means for writing of data comprising means for signaling from the line buffer to the external bus master that the line buffer can accept data, means for obtaining control of the shared system bus by the external bus master, and said means for transferring (i) the data to the line buffer, thereafter, means for signaling the data transfer controller that the line buffer has data, means for obtaining control of the system bus by the data transfer controller and means for transferring (i) the data from the line buffer to the data transfer controller for writing to the dedicated memory.

33. The system of claim 21, wherein the line buffer resides within the first device, and wherein said means for transferring (i) comprises means for employing an internal DMA channel to transfer data between the line buffer and the dedicated memory, and wherein said means for transferring (ii) comprises means for employing an external DMA channel to transfer data between the line buffer and the second device.

34. The system of claim 21, wherein the first device is coupled to the shared system bus across a single set of bus pins and wherein multiple types of read/write functions can occur across the single set of bus pins depending upon the second device, wherein the second device comprises at least two different functional units coupled to the shared system bus.

35. The system of claim 34, wherein said single set of bus pins comprise means for allowing transfers between any one of the dedicated memory of the first device and one of an external processor, an external peripheral and an external disk drive device, wherein the external processor, the external peripheral and the disk drive device comprise different functional units.

36. The system of claim 21, wherein the first device comprises an integrated system of a set top box system, the integrated system including a memory controller coupled to the dedicated memory, an internal processor coupled to the data transfer controller, an arbiter for arbitrating access to the shared system bus, and a bus interface coupled between the data transfer controller and the shared system bus, wherein the data transfer controller is a DMA controller.

37. The system of claim 36, wherein the second device is one of a DMA slave or a DMA master coupled to the shared system bus.

38. The system of claim 37, wherein the second device comprises the DMA slave, the DMA slave comprising a disk drive device.

39. The system of claim 38, wherein the second device comprises the DMA master, the DMA master comprising an external processor coupled to the shared system bus.

40. The system of claim 21, wherein said means for transferring (i) comprises a first transfer operation and said means for transferring (ii) comprises a second transfer operation, wherein said first and second transfer operations are independent, said first and second transfer operations sharing said line buffer.

41. A set top box system comprising:
an integrated system including a direct memory access (DMA) controller, an internal processor, a line buffer, an arbiter, and a bus interface, wherein said DMA controller is coupled to said internal processor and is coupled across said bus interface to an external shared system bus, and wherein said line buffer and said arbiter are each coupled to said external system bus, said integrated system having dedicated memory associated therewith;
said integrated system further being connected to a second device, across shared system bus, said second device comprising one of a DMA slave or a DMA master; and
wherein said line buffer is adapted to function in a first data transfer mode as a DMA master, and in a second data transfer mode as a DMA slave depending upon whether said second device comprises a DMA slave or a DMA master, respectively, said line buffer being employed in transferring data between said second device and said dedicated memory of said integrated system.

42. At least one program storage device readable by a machine, tangibly embodying at least one program of instructions executable by the machine to perform a method of transferring data between a first device and a second device, comprising:
transferring data between the first device and the second device using a line buffer connected to a shared system bus, the shared system bus coupling the first device and the second device, said transferring comprising:
(i) transferring data between the line buffer and dedicated memory of the first device, wherein the first device comprises a data transfer controller coupled across a bus interface to the shared system bus, said transferring (i) comprising using the data transfer controller to transfer data between the dedicated memory and the line buffer;
(ii) transferring data between the line buffer and the second device across the shared system bus, wherein said transferring (i) precedes said transferring (ii) when data is read from said dedicated memory for output to the second device, and wherein said transferring (ii) precedes said transferring (i) when data is to be written to said dedicated memory from said second device;
wherein said method further comprises setting up the line buffer as a bus slave or a bus master depending upon whether the second device comprises a bus master or a bus slave, respectively; and
wherein said transferring data comprises transferring a block of data comprising multiple words of data utilizing a single transferring (i) operation and a single transferring (ii) operation.

43. The at least one program storage device of claim 42, wherein the line buffer comprises a first transfer mode and a second transfer mode, wherein when in the first transfer mode, the line buffer functions as a bus master, and when in the second transfer mode the line buffer functions as a bus slave.

44. The at least one program storage device of claim 43, wherein the line buffer is in the first transfer mode when the second device comprises a bus slave device, and is in the second transfer mode when the second device comprises a bus master device.

45. The at least one program storage device of claim 42, further comprising setting up the line buffer as a bus slave or a bus master depending upon whether the second device comprises a bus master or a bus slave, respectively.

46. The at least one program storage device of claim 42, wherein said transferring data comprises transferring multiple words of data using a single transferring (i) operation and a single transferring (ii) operation.

47. The at least one program storage device of claim 42, wherein the line buffer resides within the first device, and wherein said transferring (i) comprises employing an internal DMA channel to transfer data between the line buffer and the dedicated memory, and wherein said transferring (ii) comprises employing an external DMA channel to transfer data between the line buffer and the second device.

48. The at least one program storage device of claim 42, wherein the first device is coupled to the shared system bus across a single set of bus pins and wherein multiple types of read/write functions can occur across the single set of bus pins depending upon the second device, wherein the second device comprises at least two different functional units coupled to the shared system bus.

49. The at least one program storage device of claim 48, wherein said multiple types of functions include allowing transfers between any one of the dedicated memory of the first device and one of an external processor, an external peripheral and an external disk drive device, wherein the external processor, the external peripheral and the disk drive device comprise the at least two different functional units.

50. The at least one program storage device of claim 42, wherein the first device comprises an integrated system of a set top box system, the integrated system including a memory controller coupled to the dedicated memory, an internal processor coupled to the data transfer controller, an arbiter for arbitrating access to the shared system bus, and a bus interface coupled between the data transfer controller and the shared system bus, wherein the data transfer controller is a DMA controller.

51. The at least one program storage device of claim 42, wherein said transferring (i) comprises a first transfer operation and said transferring (ii) comprises a second transfer operation, wherein said first and second transfer operations are independent, said first and second transfer operations sharing said line buffer.

* * * * *